(12) United States Patent
Elkind

(10) Patent No.: US 8,709,132 B1
(45) Date of Patent: Apr. 29, 2014

(54) SEPARATING HYDROGEN FROM DISASSOCIATED WATER

(75) Inventor: Jerome Lee Elkind, Dallas, TX (US)

(73) Assignee: Stellar Generation, LLC, Dallas, TX (US)

( * ) Notice: Subject to any disclaimer, the term of this patent is extended or adjusted under 35 U.S.C. 154(b) by 240 days.

(21) Appl. No.: 13/275,087

(22) Filed: Oct. 17, 2011

(51) Int. Cl.
  *B01D 53/22* (2006.01)
  *C01B 13/00* (2006.01)
  *C01B 3/06* (2006.01)

(52) U.S. Cl.
  USPC ............. 95/45; 95/54; 95/55; 95/56; 96/4; 96/8; 423/579; 423/658.2; 205/340; 205/628

(58) Field of Classification Search
  USPC ......... 95/45, 54, 55, 56; 96/4, 8, 10; 423/579, 423/658.2; 205/340, 628; 204/248
  See application file for complete search history.

(56) References Cited

U.S. PATENT DOCUMENTS

| | | | | |
|---|---|---|---|---|
| 4,476,105 | A * | 10/1984 | Greenbaum | 95/55 |
| 6,726,893 | B2 * | 4/2004 | Lee et al. | 95/55 |
| 7,909,979 | B2 * | 3/2011 | Yamada et al. | 205/340 |
| 8,454,807 | B2 * | 6/2013 | Nomura et al. | 204/248 |
| 2011/0300065 | A1 * | 12/2011 | Nakanishi et al. | 95/46 |

* cited by examiner

*Primary Examiner* — Jason M Greene
(74) *Attorney, Agent, or Firm* — Fish & Richardson P.C.

(57) ABSTRACT

In some implementations, a system for disassociating water includes a decomposition chamber, a heating element, a plurality of hollow fiber membranes, and a water inlet. The heating element is positioned in the decomposition chamber and configured to generate heat sufficient to dissociate at least a portion of water to hydrogen and oxygen. The plurality of hollow fiber membranes include at least a section of each hollow fiber membrane that passes through the decomposition chamber and has an inner conduit and an outer wall. The inner conduit for each hollow fiber membrane is configured to pass a sweep gas, and the outer wall for each hollow fiber membrane is configured to selectively pass either oxygen or hydrogen. The water inlet connected to the decomposition chamber and configured to pass water vapor into the decomposition chamber.

39 Claims, 8 Drawing Sheets

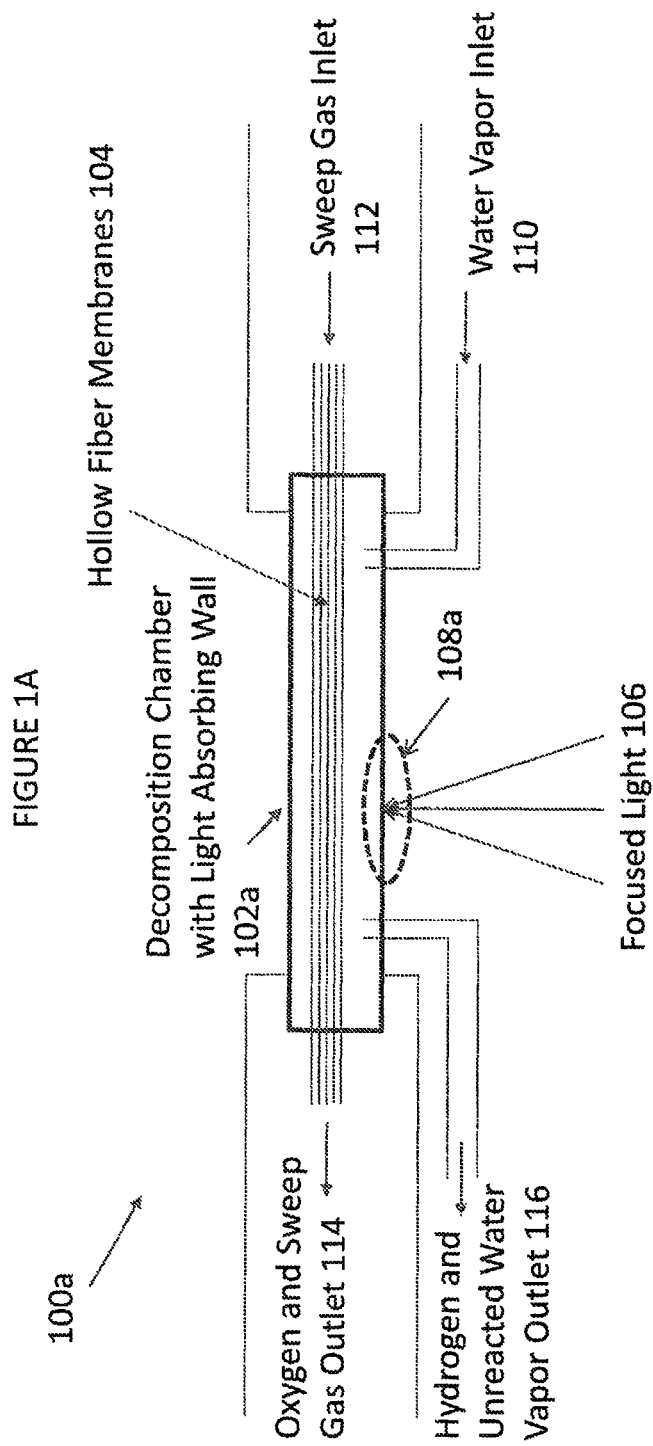

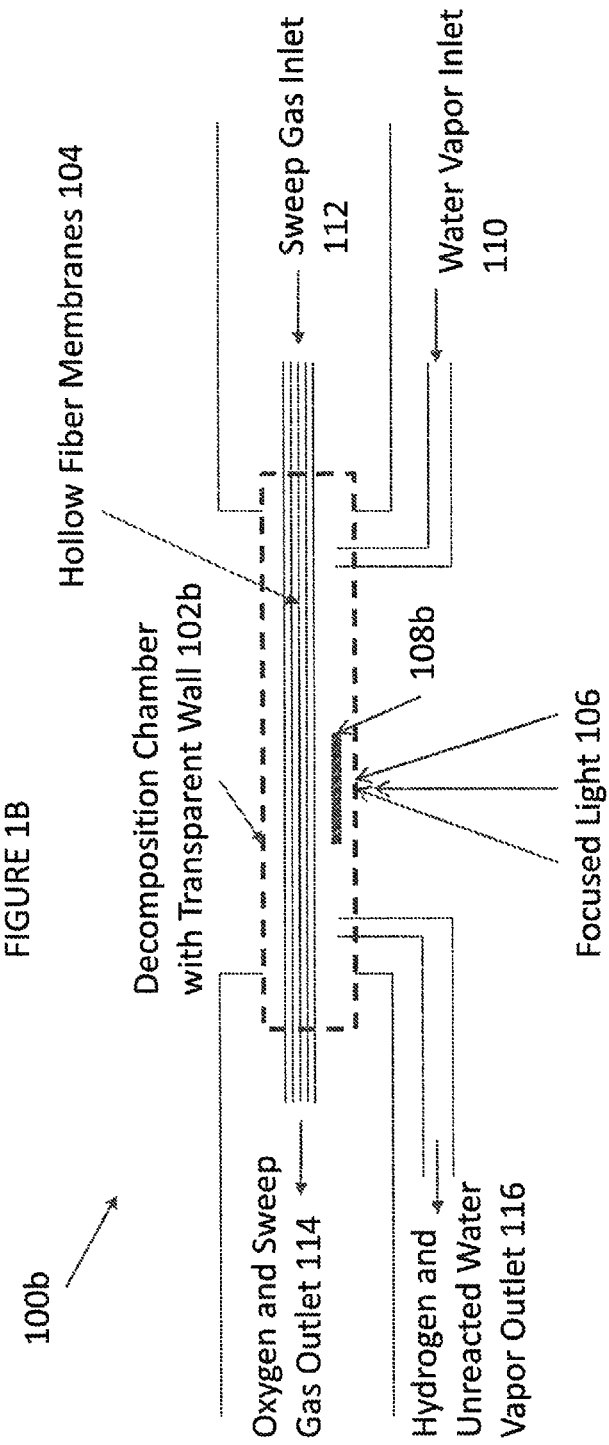

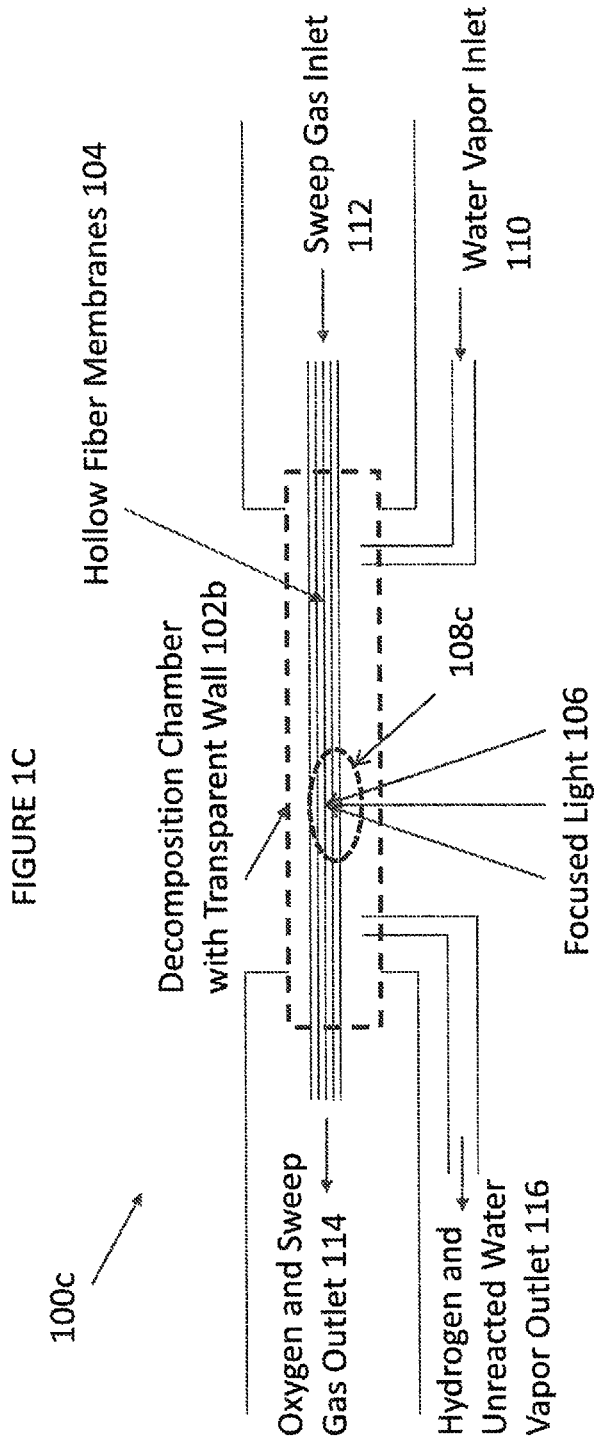

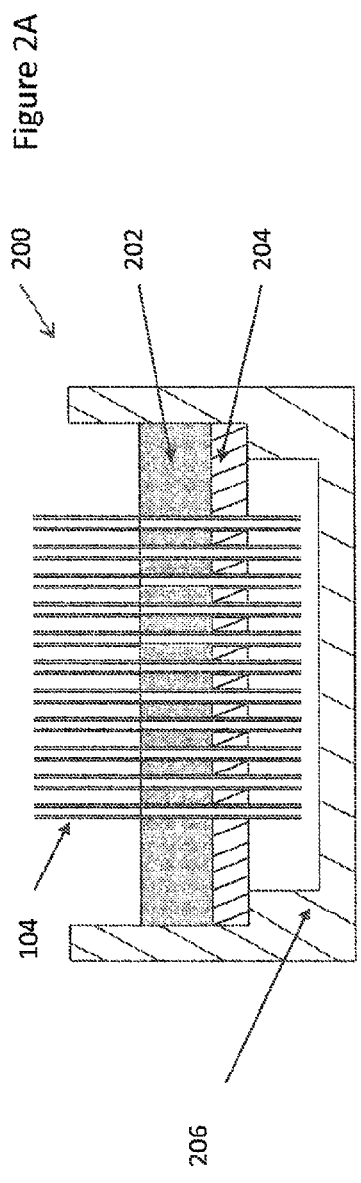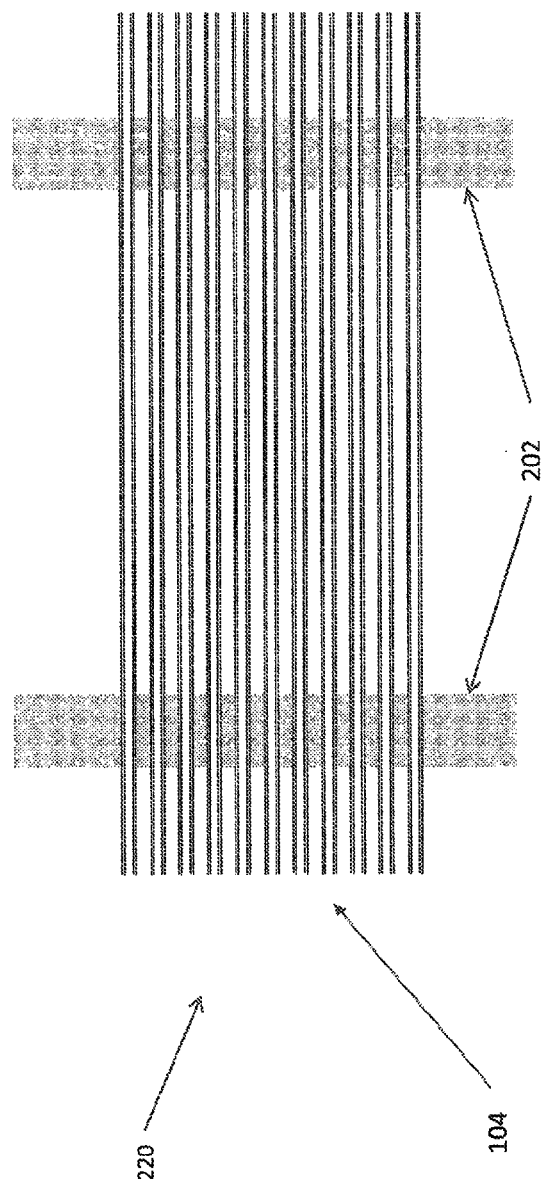

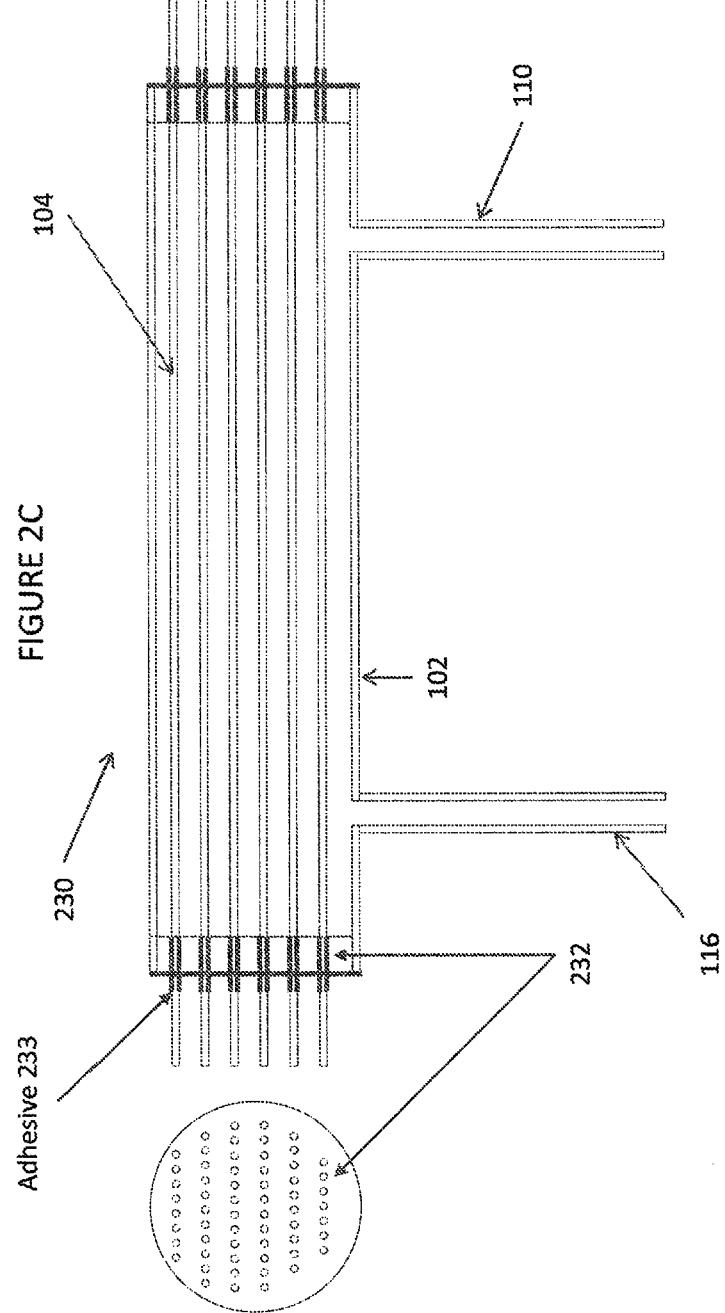

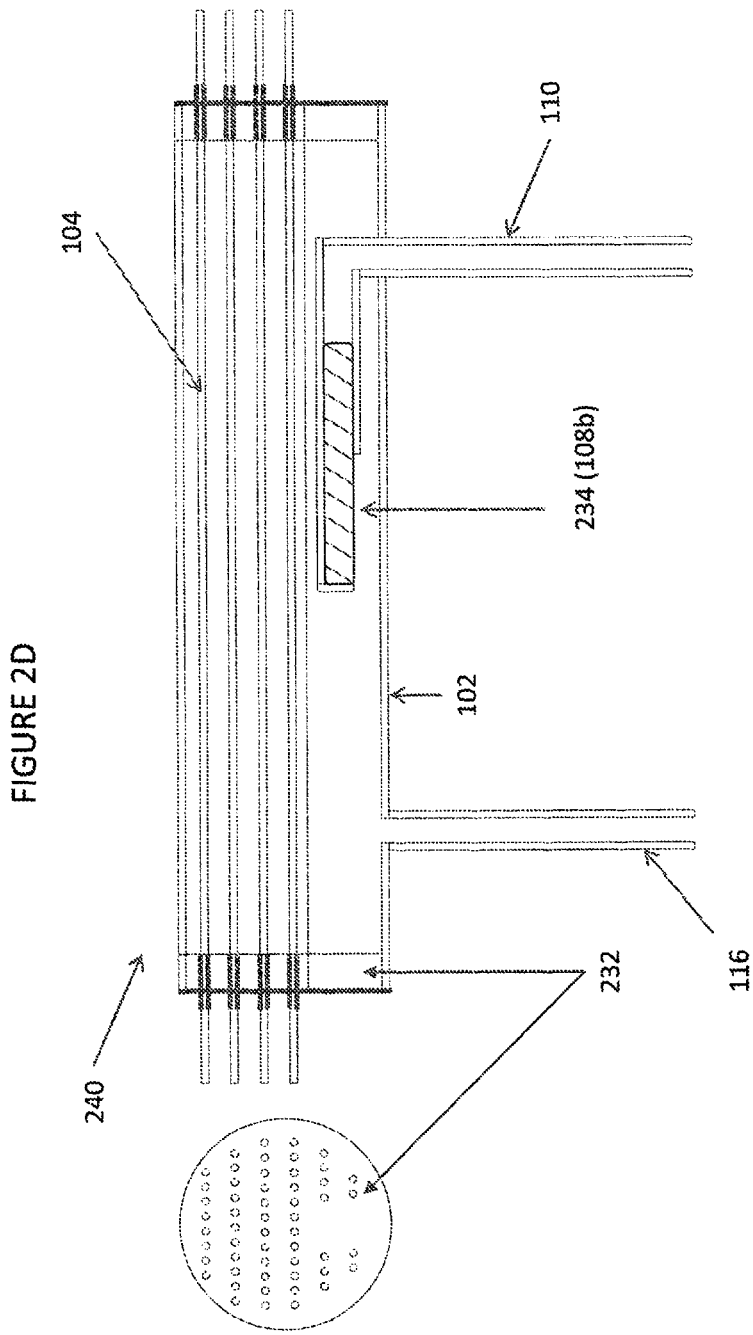

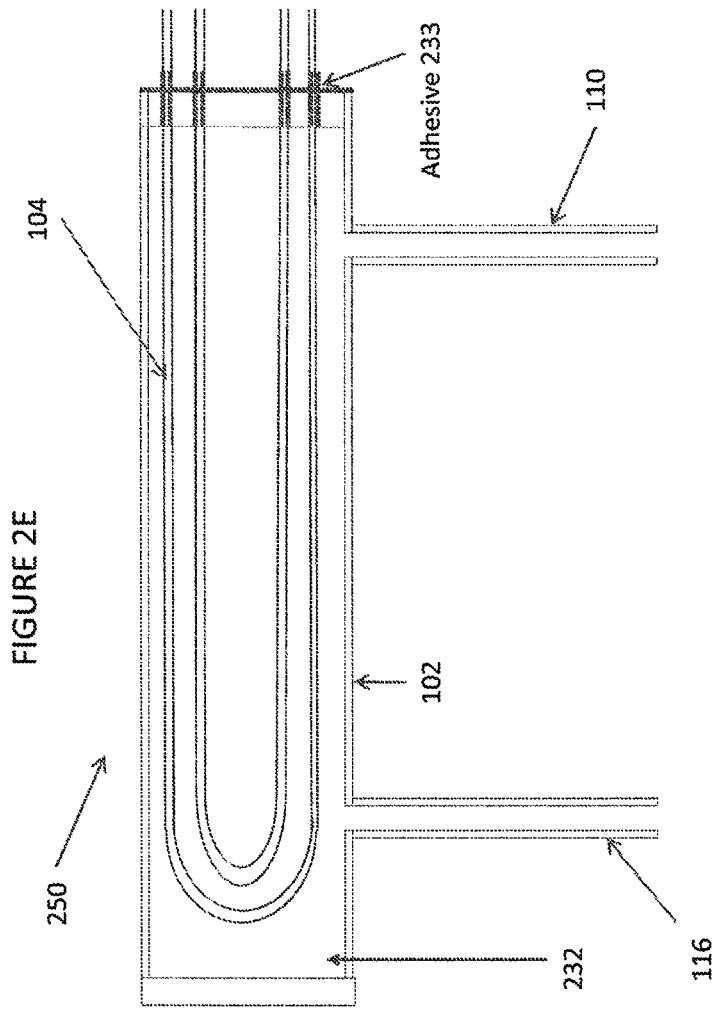

SEPARATING HYDROGEN FROM DISASSOCIATED WATER

TECHNICAL FIELD

This invention relates to hydrogen production and, more particularly, to separating hydrogen from disassociated water.

BACKGROUND

On-going geo-political concerns, concerns for global warming, and rising oil prices are fueling the push for renewable energy sources such as wind and solar power. Today, the majority of the electricity generated in the United States is produced by burning fossil fuels, such as coal, natural gas, and petroleum, nuclear power and hydroelectric power. Energy produced from alternative energy sources, such as wind and solar power, account for a small percentage of the total electricity produced in the United States. Our reliance on fossil fuels and nuclear power has several drawbacks. While fossil fuels are comparatively inexpensive, there is only a limited supply of fossil fuels, which will eventually be depleted if alternative energy sources are not found. Further, the burning of fossil fuels to produce electricity emits greenhouse gases that contribute to global warming. Nuclear power presents environmental and nuclear proliferation hazards.

Solar energy and wind power are promising alternative energy sources that can reduce reliance on fossil fuels for generating electricity. Solar energy and wind power are renewable resources so there is no concern about future depletion of these resources. Further, the generation of electricity from solar energy and wind power does not emit greenhouse gases and is therefore considered more environmentally friendly. Also, generation of electricity from renewable energy sources does not generate hazardous by-products that need to be disposed of.

In the field of solar energy utilization, much work has been done to develop a system that is economical enough to replace the combustion of fossil fuels to supply the growing needs of our ever more highly populated planet in a clean and renewable way. Solar photovoltaic systems have received the most attention over the years and yet suffer from a very high cost of equipment. Even with government subsidies, 25 year payback periods are common. In addition, because electricity is very expensive to store, the use of periodic energy sources such as solar to produce electric power is problematic.

A better approach would be to use solar energy to produce a fuel, which could be stored and transported easily and economically. This fact has led to a great deal of research into ways to use sunlight to produce fuels from low energy feedstock, most notably to produce hydrogen from water. This arises largely from the well-known fact that hydrogen, when used as a fuel produces only water, which truly makes hydrogen a "clean fuel" candidate. Despite the large body of work on this topic there is not yet an economical process in practice.

Electricity for electrolysis may come from renewable resources such as solar or wind, but ~60 kWhr is required to produce 1 kg of hydrogen from water electrolytically. This limitation renders this process too expensive to compete in the energy marketplace with fossil fuels.

Direct thermal decomposition of water has been proposed as a possible way to avoid the inefficiencies and expense of the photon-to-electron conversion step that limits the aforementioned solar electrolysis system approach. The follow formula illustrates the decomposition:

$$2H_2O + Heat \rightarrow 2H_2 + O_2$$

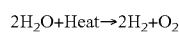

To generate thermal decomposition of water, very high temperatures are required to produce appreciable amounts of reaction products, i.e., hydrogen and oxygen. This imposes very strict requirements on reactor materials, because they are exposed to very high temperatures and very reactive gasses. Thermal shock and very large thermal gradients are also a concern because of mismatches in thermal expansion coefficients for different construction materials. Besides thermal and chemical stability, the direct thermal decomposition system should also be able to allow for the separation of the reaction products, oxygen and hydrogen from each other to avoid recombination. In order to accomplish this separation, the gases must either be cooled rapidly and then separated later or separated when hot. Rapid cooling or quenching while potentially effective at preventing recombination, also limits the process in 2 important ways. First, it limits how far the decomposition reaction may proceed to what is formed at equilibrium. Second, it inevitably results in significant heat loss during quenching as all of the unreacted water must be cooled along with the product gases.

Separating the hydrogen and oxygen gases while hot may be accomplished by using ceramic-based high temperature hydrogen permeable membranes and/or high temperature oxygen permeable membranes. As a result, work in this area has taken place, however successful implementation of a commercially successful system with sufficient robustness and gas throughput has not occurred.

In general, membranes large enough to have sufficient gas throughput also have to be very thick to maintain structural integrity, which reduces gas permeability. Another limitation to gas throughput is available surface area. Gas permeation rates are generally linearly proportional to membrane surface area, and, for very high temperature reactors, the available surface area can be quite limited. For example, a 5 square meter ($m^2$) solar collector is capable of supplying about 5 kW of heating power from the sun to a high temperature reactor. In order to achieve the temperatures needed to cause thermal decomposition of water, a concentration factor of about 5,000 times might be needed. This means that the 50,000 $cm^2$ of sunlight collection area would need to be focused down to approximately a 3.5 cm diameter spot. Assuming 20% of this energy is used to decompose water, approximately 2 liters per minute of oxygen will need to be removed from the system during operation so that the hydrogen produced could be preserved. Any high-temperature reactor system that uses one or more of the decomposition chamber walls as the separation medium, as has been proposed in the past, would not be able to achieve the required surface area (at least 2000 $cm^2$) in a practical manner. In addition any attempt to supply the require membrane area in such a scheme would then also require a thickness to sustain the pressure differentials required for oxygen separation, which would further reduce oxygen permeation capability. Altogether, such a system has a gas permeation insufficiency of 100 to 1000×.

SUMMARY

The present disclosure is directed to generating hydrogen using thermal energy. In some implementations, a method includes concentrating solar energy on an absorption element to heat the absorption element to about 2,000° C. or greater. The absorption element is in thermal contact with water. The water inside the decomposition chamber is at a low pressure of, for example, approximately 760 Torr or less, and at least a portion of the water disassociates based on heat from the absorption element. The oxygen is selectively removed from the high temperature gas mixture, thereby allowing the reaction to proceed beyond where thermochemical equilibrium limits would apply, by utilizing a multitude of hollow fiber membranes that, under appropriate conditions, selectively pass oxygen at high temperatures. In some implementations, for example a hollow fiber membrane can be a tubular membrane with a small diameter (less than about 3 mm) and a wall thickness between 100 and 200 micrometers. In some implementations, a hollow fiber membrane module can include an assembly of fibers. In these instances, the hollow fiber assembly can contain up to 10,000 fibers or more, each ranging from 200 to 2500 μm in diameter, which may provide a very large surface area within a small enclosed volume that increases the volume efficiency of the separation process.

Some implementations may include one or more of the following advantages. Using sunlight as heat allows for a very efficient use of sunlight as opposed to photolytic processes which are only sensitive to specific portions of the sun's spectrum. Using water as the feed stock instead of natural gas or methane is advantageous because substantially no $CO_2$, which is a greenhouse gas and contributes to global warming, is produced. In addition it is well known that fossil fuel resources are limited. Using highly concentrated light allows for the size of the processing equipment to be reduced because light is focused to a small area. In comparison, solar photovoltaic systems typically require the sunlight to be collected by expensive solar cells instead of relatively cheap reflectors. A multitude of hollow fiber membranes combined with either a vacuum or sweep gas is used to accomplish a high temperature separation of the product oxygen. The use of hollow fibers has the advantages of increasing the membrane surface area and reducing membrane wall thickness while minimizing the volume occupied and this is essential when very high solar concentrations, and concomitant small spot sizes, are used to reach very high temperatures. Hydrogen as a fuel essentially has no environmental impact as opposed to gasoline, for example, which emits $CO_2$, smog components, and generally includes potent carcinogens which can leak from storage tanks into ground water. The disclosed process for producing hydrogen may be more economical than current approaches because some implementations disclosed below can use simple, existing technology (e.g., extruded ceramic hollow fibers), inexpensive feed stock—water, a free power source—sunlight, and/or means for harvesting said sunlight which is cheap (e.g., large plastic optics). In addition, the disclosed process may be scalable to small systems. In these implementations, that means it will be economical even when it is configured as a small system because the hydrogen production can be moved to point of use locations. In these instances, these implementations can have a huge advantage as the designs eliminate substantial transportation and/or storage issues that come with a large centralized hydrogen production facility.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A-C are a block diagram illustrating an example hydrogen system in accordance with some implementations of the present disclosure;

FIGS. 2A-E illustrate examples of the decomposition unit of FIG. 1;

Like reference symbols in the various drawings indicate like elements.

DETAILED DESCRIPTION

Figure 3:
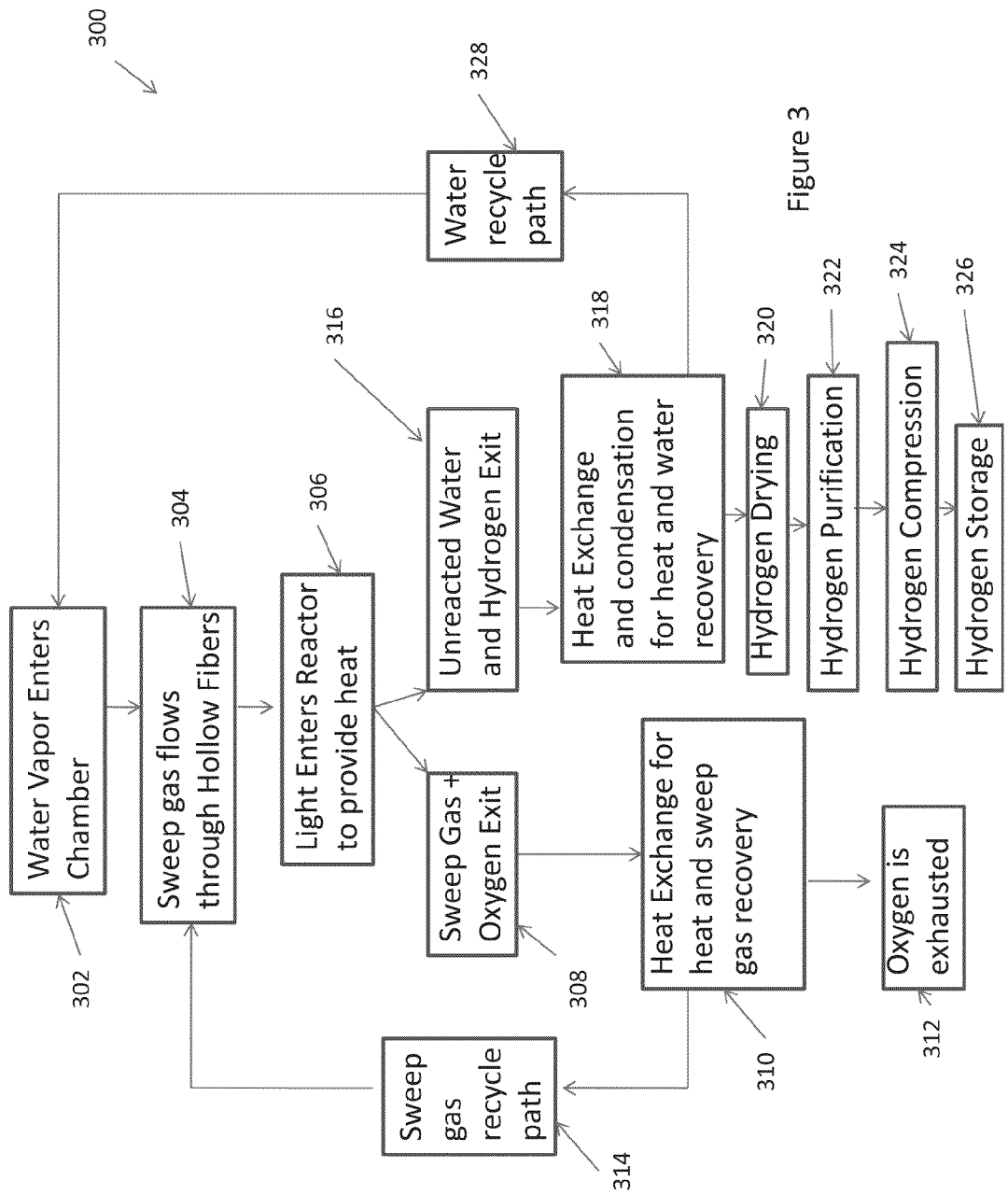
FIG. 3 is a flow chart illustrating an example method for generating hydrogen.

FIGS. 1A-C are block diagrams illustrating systems 100a-c for separating hydrogen from disassociated water. For example, the systems 100a-c may focus light on a target area configured to absorb the incident energy such that the target area generates sufficient heat to disassociate water into hydrogen and oxygen. In other words, the thermal energy that can break apart or otherwise disassociate water molecules and can be generated, in some implementations, by concentrating sunlight onto the target area. For example, the systems 100a-c may concentrate sunlight in the range of about 2,000-10,000 suns (e.g., 5,000) on a dark refractory material. In some implementations, the system 100 may include a plurality of concentrators such as an array of mirrors or lenses to generate sufficient solar energy to heat the target area. In doing so, the system 100 may convert at least a portion of incident solar energy to thermal energy sufficient to disassociate water. For example, the system 100 may concentrate solar energy on the target area configured to both absorb at least a portion of the incident light (e.g., visible, ultraviolet) and generate sufficient thermal energy (e.g., about 2,000° C.) to disassociate water. In addition to disassociation, the system 100 can be configured to generate a hydrogen stream from the remaining components (e.g., hydrogen, oxygen, water vapor). For example, the system 100 may generate a differential in partial pressure across a selective membrane that selectively filters, for example, the hydrogen or the oxygen to form a filtered stream. The differential in partial pressure may be generated by passing a gas (e.g., inert gas) across a surface of the selective membrane. In some implementations, the systems 100a-c may execute one or more of the following: pass water vapor into a decomposition chamber; focus sunlight on a light-absorbing target; generate heat sufficient to disassociate the water vapor; selectively filter at least one of the hydrogen or the oxygen; separate the hydrogen from a filtered stream; and/or other process.

Referring to FIG. 1A, the system 100a includes a decomposition chamber 102 and hollow fiber membranes 104 passing through at least a portion of the decomposition chamber 102. In addition, the system 102 includes a focused light 106 incident a target area 108, a water vapor inlet 110 for passing water vapor to the decomposition chamber 102, sweep-gas inlet 112 for passing sweep gas through the hollow fiber membranes 104, an outlet 114 for passing sweep gas and oxygen from the hollow fiber membranes 104, and an outlet 116 for passing hydrogen and water vapor from the decomposition chamber 116. As for a high-level description of operation, the focused light 106 is incident the target area 108a which generates sufficient heat to disassociated water. The inlet 110 introduces or otherwise passes water vapor into the decomposition chamber 102 and the heated target area 108a disassociates at least a portion of the water vapor into hydrogen and oxygen. In connection with the disassociation process, the inlet 112 introduces sweep gas through the hollow fiber membranes 104 and generates a differential in partial pressure between, for example, the oxygen in the decomposition chamber 102 and oxygen in the hollow fiber membranes 104. This oxygen partial pressure difference allows the hollow fiber membranes 104 to selectively pass the oxygen through the wall of the hollow fiber membrane and from there the sweep gas carries the oxygen from hollow fiber membranes 104 through the outlet 114. The outlet 116 passes the hydrogen and remaining water vapor from the decomposition chamber 102 using, for example, a pump.

As for a more detailed description, the decomposition chamber 102 may include materials that have high melting points and/or are resistant to oxidation because very high temperatures are generated for disassociation and superheated oxygen is very reactive. In some implementations, the decomposition chamber 102 may include an oxide-based ceramics (e.g., zirconia, alumina, magnesia and/or hafnia). In addition to being unreactive with hydrogen, and oxygen and water at high temperatures and having a very high melting point, this material may also have low thermal conductivity (e.g., about 2 Watts/Meter/° K) to minimize or otherwise reduce the loss of system heat from a reaction zone and/or simplify the system design. Disassociation of the water molecule is accomplished by direct thermal decomposition at high temperatures as illustrated in Equation 1.

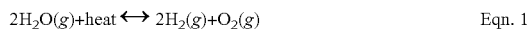

$$2H_2O(g) + heat \longleftrightarrow 2H_2(g) + O_2(g) \qquad \text{Eqn. 1}$$

It is well known in the art that when this reaction is in equilibrium, the fraction of water that is in a disassociated form is a function of several parameters such as temperature and pressure. In some implementations, the decomposition chamber 102 may generate or otherwise provide temperatures in excess of about 2000° C. in order to allow for appreciable disassociation of water. The decomposition chamber 102 may increase the amount of hydrogen and oxygen decomposition products by maintaining the heated water at a pressure below atmospheric pressure. For example, the decomposition chamber 102 may disassociate the water at a pressure between about 1 Torr and about 500 Torr (e.g., about 5 Torr, about 20 Torr). In some implementations, the decomposition chamber 102 may decompose four times as much water at 7 Torr vs. 760 Torr when operating at about 2200° C.

In some implementations, a portion of the decomposition unit 102 forms a target area 108a for the focused sunlight 106. As previously mentioned, the target area 108a generates sufficient heat to disassociated water using the incident solar energy. As illustrated, the target area 108a is a portion of a wall of the decomposition chamber 102 where decomposition of the water predominately occurs. In some implementations, at least portions of the decomposition chamber 102 may be resistant to thermal shock. In the case that the target area 108a is a wall of the decomposition chamber 102 and receives thermal energy from concentrated sunlight, the decomposition chamber 102 may include material that efficiently absorbs visible light (e.g., light with wavelengths below about 900 nanometers), which is the dominant component in terrestrial sunlight. In some implementations, the target area 108a may be formed by darkening at least a portion of the wall of the decomposition chamber 102. For example, the target area 108a may be darkened by soaking while the native ceramic is in a green or presintered state, incorporating dark materials in a mixture used to form the target area 108a, firing the target area 108a in a reducing atmosphere, and/or other processes. In some implementations, the decomposition chamber 102 may include a target area 108a adjacent an outer wall such that the target area 108a absorbs the sunlight and transfers the thermal energy to an inner wall of the decomposition unit. For example, the decomposition chamber 102 may include a coating that is darker than the body of the decomposition unit and that is adjacent and covers at least a portion of the outside of the decomposition unit 102 to form the target area 108a. In these instances, the target area 108a may transfer thermal energy to the inner wall primarily through conduction. The target area 108a may, for example, include graphite and/or silicon carbide, which are excellent absorbers of visible light and are both stable at very high temperatures such as about 2000° C. or greater.

While carbon-containing materials (e.g., silicon carbide, graphite) would oxidize in the oxygen-rich reactive environment inside the decomposition unit, such materials, as an outside coating, that is not in contact with the hot water or hot decomposition products or other reactive gases may effectively help transmit energy into the decomposition chamber 102 that would have been otherwise reflected or transmitted by the first, lighter colored, material and does so without reacting, itself. While the decomposition chamber 102 has been described as including one or more materials, the decomposition chamber 102 may include the same, none, or different materials and/or with different optical properties without departing from the scope of the disclosure. Similarly, the hollow fiber membranes 104 may include materials that have high melting points and/or are resistant to oxidation because very high temperatures are generated for disassociation and superheated oxygen is very reactive. For example, the hollow fiber membranes 104 may include an oxide-based ceramics (e.g., zirconia, alumina, magnesia and/or hafnia). In some implementations, the hollow fiber membranes 104 can selectively pass one or more components such as oxygen or hydrogen. For example, the hollow fiber membranes 104 may be a material that is capable of selectively passing oxygen (e.g., stabilized zirconia). In these instances, the hollow fiber membranes 104 may pass oxygen to an inner conduit while hydrogen remains in the decomposition chamber 102. In the illustrated implementation, the hollow fiber membranes 104 enters through one wall of the decomposition chamber 102 and pass through a different wall. This implementation is for illustration purposes only and the hollow fiber membranes 104 may have other configurations without departing from the scope of this disclosure. For example, the hollow fiber membranes 104 may be curved or u-shaped such that the membranes enter and exit the same wall or an adjacent wall as opposed to an opposite wall. This might help minimize thermal stresses associated with non-uniform heating. In addition, a seal may be formed between the hollow fiber membranes 104 and the decomposition chamber 102 to substantially prevent components leaking from the decomposition chamber 102. In these instances, the hollow fiber membranes 104 can seal-ably pass through the decomposition-chamber walls such that oxygen can be removed either by evacuating the interior of the hollow fibers or by passing a sweep gas through the interior of the hollow fibers. A very low partial pressure of oxygen (e.g., close to 0 Torr) may be maintained inside the hollow fiber membranes 104 because the oxygen permeation process is driven by the oxygen partial pressure difference between inside and outside the hollow fibers membranes 104.

Hollow fiber membranes 104 may provide several advantages over other high temperature reactor system geometries. First of all, this geometry may allow the wall thickness to be very small compared to that of planar membranes or other larger structures. For example, a hollow fiber membrane with a 0.6 mm OD may have a wall that is only 50-100 microns thick, whereas a similarly self-supporting planar membrane might require a thickness of at least 500 to 1000 microns depending on area. This difference may provide at least a 5 to 20× improvement in oxygen permeability.

A second advantage of hollow fiber membranes 104 may include the associated increase in surface area available for separation processes. A single hollow fiber membrane with a 0.6 mm OD and a 120 mm length has a surface area that is about 2.3 cm². In addition, over 600 hollow fiber membranes can fit inside a cylindrical decomposition chamber that has a 2.54 cm (1″) diameter. This example arrangement would provide almost 1500 cm² of membrane surface area. This is at least 15 times more than if the entirety of the decomposition chamber walls were made from zirconia.

A third advantage may include an ability to seal the junctions between the decomposition chamber 104 and the hollow fiber membranes. In order for hollow fiber membranes 104 to function properly, a gradient of oxygen partial pressures across the membrane 104 is formed. To assist in forming this differential, the outer portion of the hollow fiber membrane 104 may be hermetically or substantially hermetically sealed from the inner portion. In some implementations, the hollow fiber membranes 104 can be potted into an end cap for sealing.

A fourth advantage may involve the stresses that accompany a very high temperature reactor such as decomposition chamber 102 when composed of more than one material with different coefficients of thermal expansion (CTEs). Even in the case of a decomposition chamber 102 composed of a single material, the very large temperature gradients created by the use of highly focused light for heating may produce stresses that, if not relieved, may cause cracking. The fact that hollow fiber membranes 104 may be configured to flex and bend when, for example, the center is heated while the ends are fixed in space, but are not heated may avoiding cracking due to rapid and extreme thermal changes and shock.

The water vapor inlet 110 provides water vapor or water in any suitable carrier to the decomposition chamber 102 for disassociation. In some implementations, the water vapor is de-ionized. The water vapor inlet 110 may include a filtration system (e.g., membrane) to remove contaminants such as metal. In addition, the water vapor inlet 110 may be coupled to a heat exchanger that recovers some heat from gases exiting the decomposition chamber 102 through outlet 116 and that heats the water vapor prior to feeding the decomposition chamber 102. Regardless, the water vapor inlet 110 provides the water vapor stream to the decomposition chamber 102 which is heated to, for example, about 2000° C. or greater. The generated hydrogen and remaining water vapor may combine to form a hydrogen-containing stream and exit the decomposition chamber through the outlet 116.

The sweep gas inlet 112 provides a sweep gas to the hollow fiber membranes 104. In some implementations, the sweep gas can be an inert gas such as argon. In implementations where the hollow fiber membranes 104 have very small inner diameters which has low gas conductance, using a sweep gas to remove oxygen (or hydrogen) from the inside of the hollow fiber membrane 104 may be more effective because a higher pressure can be used) than simply using a vacuum pump to evacuate the hollow fiber membrane. The sweep gas may be unreactive with the hollow fiber tube membranes 104 and the product gases and candidates include argon, nitrogen and water vapor, among others. The sweep gas combines with the oxygen filtered through the membranes 104 to form a combined stream that exits the outlet 114. The combined stream may be separated into components such as an oxygen stream and a sweep gas stream.

Valves on inlet 104 and outlet 108 (not illustrated) may be opened and closed to set the residence time of the water vapor in the decomposition chamber 100 to maximize or otherwise increase energy efficiency and/or hydrogen production. Also, the decomposition chamber may include packing material configured to generate turbulent gas flow, which may increase heat transfer to the water vapor molecules. Packing materials could be ceramic grog, fibers, fabric, foams or the like that have high thermal and chemical stability. In some implementations, the packing materials can be the light-absorbing target.

Referring to FIG. 1B, the system 100b illustrates an example implementation including a target area 108b located inside the decomposition chamber 102. In particular, the target area 108b is located between the inner surface of the wall of the decomposition chamber 102 and the fiber hollow membranes 104. In some implementations, the target area 108b is separate from the decomposition chamber 102 and the fiber hollow membranes 104. In addition, at least a portion of the decomposition chamber 102 may be transparent or substantially transparent to the focused light 106. In these instances, the focused light 106 may pass through the wall of the decomposition chamber 102 and is incident the target area 108b. In some implementations, the light absorbing target 108b is a dedicated refractory element, such as a disk, packing material or a water inlet nozzle or showerhead. In addition, the light-absorbing target 108b may be able to withstand high temperatures and/or unreactive to high temperature water, oxygen and hydrogen gases. The target 108b serves to transfer heat to water molecules to drive decomposition.

In these cases, where the decomposition chamber walls are substantially transparent to sunlight, the target area 108b may be formed using options for providing a surface to absorb the light and heat up. In one option, the target 108b may simply be some or all of the hollow fiber membranes 104 (see FIG. 1C). In that case, some or all of the hollow fiber membrane surface area may be darkened to enhance light absorption. In the case where a separate light absorbing target 108b is provided inside the decomposition chamber 102 as shown in the system 100b, this target 108b may also be darkened to enhance light absorption.

Since the target 108b may be able to sustain very high temperatures such as 2000° C. in order to drive water decomposition, the target 108b may be a refractory material that is stable not only at high temperatures but also in the presence of highly reactive gases at high temperatures. In some implementations, the target 108b may be partially or fully stabilized zirconia. Zirconia has additional properties that may be beneficial for this application. First, it can selectively transmit oxygen through its lattice making it suitable as a hollow fiber membrane material as well as a target 108b. It also has a relatively low thermal conductivity which may be beneficial because it will hinder the conductance of heat outside the system 100.

Several methods of darkening zirconia from its natural white state can be used. One example is adding suitable black oxides or other black compounds before extruding and firing the material. It can also be blackened while still in the "green" state by soaking in an appropriate metal salt solution (e.g., manganese chloride ($MnCl_2$)) and allowing appropriate metal ions to enter surface pores. When this is done, color is imparted during subsequent firing. Firing zirconia in a reducing atmosphere can also produce a darkened material. Additionally, depositing a dark film such as graphite or silicon carbide on the surface can also be effective in some cases.

In some implementations, the target 108b may only be darkened in a few portions of the light target 108b. For example, in the case of using some of the hollow fiber membranes 104 as the light absorbing target 108b, darkening only the portion that will be illuminated avoids any reduction of the gas permeation rate that may be caused by the presence of the darkening agent.

Other materials capable of selectively passing oxygen and serving as hollow fiber membranes 104 may be used, including perovskites such as $La_{0.2}Sr_{0.8}Co_{0.8}Fe_{0.2}TiO_{3-x}$. While these may not be capable of withstanding direct heating to 2000° C., they could still be used at a distance away from the light absorbing target 108b, where it would be somewhat cooler, and still serve to remove oxygen from the decomposition chamber.

Referring to FIG. 1C, the system 100c is an example implementation including a target area 108c that is a portion of the hollow fiber membranes 104. As with system 100b, the system 100c includes a decomposition chamber 102b that is transparent or substantially transparent to the focused light 106. In these instances, the focused light 106 is incident the portion of the hollow fiber membranes 104 identified as the target area 108c. In other words, the hollow fiber membranes 104, themselves, act as the target 108c and serve to deliver heat to the water molecules to drive decomposition. In these instances, the hollow fiber membranes 104 selectively pass oxygen through their walls and are able to withstand the extremely high temperatures without damage. While stabilized zirconia can fulfill all of these conditions, many other material choices, such as La0.2Sr0.8Cu0.8Fe0.2TiO3-x, may be damaged by the high temperatures experienced as the target 108c.

In the systems 100a-c, in order to maximize or increase the amounts of reaction product (hydrogen and oxygen) generated, the concentration of one or more of the products may be reduced so that the degree of reaction is not limited to what would otherwise be prescribed by equilibrium conditions. In these instances, the two products can be separated instead of simply recombining in a cooler portion of the reactor system.

FIGS. 2A and 2B illustrate example assemblies 200 and 220 for potting multiple hollow fiber membranes 104 into the decomposition chamber 102. Referring to FIG. 2A, the assembly 200 illustrates the hollow fiber membranes 104 with potting material 202 formed near the ends of the membranes 104. A removable template 204 abuts an outer side of the potting material 202, and both the potting material 202 is formed using the template 204 and a mold 206. In these implementations, the hollow fiber membranes 104 are held fixed in space by the removable template 204, which may be made, for example, from silicone or Teflon. The assembly 200 is placed into the mold 206 and filled with a heat-tolerant potting compound and allowed to cure. Upon removal from the mold 206 and the removable template 204 (see FIG. 2B), the assembly 220 can be inserted into the decomposition chamber 102 and sealed using a high temperature sealant. This method may be implemented in the decomposition chamber 102 with light-absorbing walls 108a as illustrated in FIG. 1A.

Referring to FIG. 2C, the assembly 230 illustrates a decomposition chamber 102b with light transparent walls (e.g., quartz). In this implementation, the assembly 230 includes end caps 232 for sealing the hollow fiber tubes 104. The end cap 232 may be laser machined from a quartz plate, including holes configured to receive the hollow fiber membranes 104 and selectively position them in space. The end cap 232 may be blown onto the end of the quartz decomposition chambers 102b and then the hollow fibers membranes 104 may be inserted and sealed in the end caps 232 with an appropriate high temperature ceramic sealant.

Referring to FIG. 2D, the assembly 240 again illustrates a decomposition chamber 102b with transparent walls (e.g., quartz). In this implementation, the assembly 240 further includes a water vapor inlet 110 that includes a ceramic inlet nozzle 234 that is either porous or has had holes formed in it so that water vapor may pass through it. In this case the ceramic inlet nozzle 234 is also the target 108b and serves to heat incoming water vapor to decomposition temperatures.

Referring to FIG. 2E, the assembly 250 illustrates a decomposition chamber 102b and hollow fiber membranes 104 where the hollow fiber membranes enter and exit though the same wall of the decomposition chamber 201b.

FIG. 3 is a flow chart illustrating an example method 300 for generating a hydrogen stream in accordance with some implementations of the present disclosure. The illustrated method is described with respect to system 100 of FIG. 1, but this method could be used by any other suitable system. Moreover, the system 100 may use any other suitable techniques for manufacturing the system 100. Thus, many of the steps in this flowchart may take place simultaneously and/or in different orders as shown. System 100 may also use methods with additional steps, fewer steps, and/or different steps, so long as the methods remain appropriate.

At a high level, method 300 includes the following processes: (1) disassociating water in steps 302 to 306; (2) generating an oxygen stream in steps 308 to 314; and (3) generating a hydrogen stream in steps 316 to 328. Method 300 begins at step 302 where water vapor enters a decomposition chamber. For example, the water inlet 110 may introduce water into the decomposition chamber 102. At step 304, sweep gas flows through the hollow fiber membranes. As for the example, sweep gas inlet 112 may introduce sweep gas into the hollow fiber membranes 104 and the sweep gas may pass through the membranes 104 and out the outlet 114. Next, at step 306, light is incident reaction chamber. In the example, the focused light 106 is incident the target area 108, which may be the wall of the decomposition chamber 102, a target inside and separate from the decomposition chamber 102, or a wall of the hollow fiber membranes 104. Turning to the process for generating an oxygen stream, the sweep gas and oxygen exit the membranes at step 308. As for the example, oxygen is selectively filtered through the hollow fiber membranes 104 and the sweep gas moves the oxygen out the outlet 114. At step 310, heat is extracted from the oxygen/sweep gas stream and the sweep gas is filtered off. For example, the system 100 may include a heat exchanger coupled to the outlet 114 and a filter for separating the sweep gas from the oxygen. Next, at step 312, the oxygen is exhausted. At step 314, the sweep gas is recycled to the hollow fiber membranes. Turning to the hydrogen-stream process, hydrogen and unreacted water exit at step 316. Returning to the example, the hydrogen and water may exit the decomposition chamber 102 through the outlet 116. Next, at step 318, the stream is cooled and the water condensed out. The hydrogen stream is dried, purified, compressed and stored at steps 320-326. The water is recycled to the decomposition chamber at step 328.

A number of embodiments of the invention have been described. Nevertheless, it will be understood that various modifications may be made without departing from the spirit and scope of the invention. For example, selectively removing hydrogen from the decomposition chamber 102 would also be an effective means of favoring product formation and substantially avoiding recombination, which could be accomplished using hollow fiber membranes 104 made from materials with appropriate properties such as supported palladium.

Indeed, outfitting the decomposition chamber 102 with both oxygen selective and hydrogen selective hollow fiber membranes 104 in numbers that may remove hydrogen twice as fast as oxygen could enable all reaction product to be removed without need for outlet 116. This design may increase energy efficiency by reducing heat losses associated with the cooling of unreacted water vapor.

There are many strategies to optimizing the heat transfer from the target to the water vapor. One is to have the target 108 be a porous ceramic material, through which water vapor enters the decomposition chamber 102. In the case of the water entering the decomposition chamber 102 through a ceramic inlet nozzle 234 that also serves as the light absorbing target 108, several candidate materials exist including ceramic foams and fabrics. Indeed, the candidates may have a high thermal and chemical stability in the decomposition environment and be sufficiently porous to allow water vapor to pass at certain rate. A simple plate with holes drilled in it may also serve as the ceramic inlet nozzle 234. Besides zirconia, examples of other potentially useful materials include hafnia, alumina, yttria and ceria. Besides proper material selection and reactor design, process conditions also help control the amount of hydrogen and oxygen that can be produced thermally from water. Low pressures and high temperatures are known to favor product formation.

Accordingly, other implementations are within the scope of the following claims.

What is claimed is:

1. A system for disassociating water, comprising:
    a decomposition chamber;
    a heating element positioned in the decomposition chamber and configured to generate heat sufficient to dissociate at least a portion of water to hydrogen and oxygen;
    a plurality of hollow fiber membranes where at least a section of each hollow fiber membrane passes through the decomposition chamber and has an inner conduit and an outer wall, wherein the inner conduit for each hollow fiber membrane is configured to pass a sweep gas, and the outer wall for each hollow fiber membrane is configured to selectively pass either oxygen or hydrogen; and
    a water inlet connected to the decomposition chamber and configured to pass water vapor into the decomposition chamber.

2. The system of claim 1, further comprising an outlet for passing water and disassociation products including hydrogen or oxygen.

3. The system of claim 1, wherein the plurality of hollow fiber membranes includes a first plurality of hollow fiber membranes having an outer wall configured to selectively pass oxygen and a second plurality of hollow fiber membranes having an outer wall configured to selectively pass hydrogen.

4. The system of claim 3, wherein the decomposition chamber is absent an outlet.

5. The system of claim 1, wherein the heating element comprises a light absorbing target heated by focused sunlight.

6. The system of claim 5, wherein the light absorbing target comprises a light absorbing wall of the decomposition chamber.

7. The system of claim 5, wherein the decomposition chamber includes a wall substantially transparent to light, and the light absorbing target is positioned in the decomposition chamber.

8. The system of claim 7, the light absorbing target comprises a nozzle for the water inlet.

9. The system of claim 7, wherein the light absorbing target comprises at least a portion of at least a subset of the plurality of hollow fiber membranes.

10. The system of claim 7, wherein the light absorbing target comprises at least a portion of included packing material.

11. The system of claim 5, wherein the light absorbing target comprises a refractory material.

12. The system of claim 11, wherein the packing material includes at least one of ceramic foam, a ceramic grog, or ceramic fabric.

13. The system of claim 11, wherein the refractory material is sufficiently dark to absorb at least a portion of incident visible light.

14. The system of claim 1, wherein the sweep gas forms a difference in partial pressure of either hydrogen or oxygen between the decomposition chamber and inner conduits for the plurality of hollow fiber membranes by removing the hydrogen or oxygen from the inner conduits.

15. The system of claim 1, wherein the sweep gas comprises at least one of nitrogen gas, argon gas, or water vapor.

16. The system of claim 1, wherein the plurality of hollow fiber membranes are formed by extrusion.

17. The system of claim 1, wherein the plurality of hollow fiber membranes comprise at least one of stabilized zirconia, $LaSrTiO_3$, perovskites, palladium, or palladium-based alloys.

18. The system of claim 1, wherein each of the plurality of hollow fiber membranes includes a curved portion such that each enters the decomposition through a same wall and exits the decomposition chamber through the same wall.

19. The system of claim 1, further comprises an inlet valve and an outlet valve, wherein opening and closing the inlet valve and the outlet valve modifies residence times of gasses in the decomposition chamber.

20. The system of claim 1, further comprising:
    a pump connected to an outlet of the decomposition chamber and configured to pump water vapor and disassociated hydrogen into a water condenser;
    the water condenser configured to condense water vapor and pass the disassociated hydrogen to a hydrogen drier;
    the hydrogen drier configured to dry the disassociated hydrogen and pass the dried hydrogen to a purifier;
    the purifier configured to purify the dry hydrogen and pass the purified hydrogen to a compressor;
    the compressor configured to compress the purified hydrogen and pass the compressed hydrogen to a storage unit; and
    the storage unit configured to store the compressed hydrogen.

21. A method for disassociating water, comprising:
    passing water vapor into a decomposition chamber;
    dissociating at least a portion of the water vapor into hydrogen and oxygen using heat;
    selectively passing either oxygen or hydrogen disassociation products into an inner conduit of a plurality of hollow fiber membranes, wherein at least a section of the plurality of hollow fiber membranes passes through the decomposition chamber; and
    passing a sweep gas through the plurality of hollow fiber membranes to remove the oxygen or the hydrogen disassociation products.

22. The method of claim 21, further comprising passing water and disassociation products including hydrogen or oxygen from the decomposition chamber.

23. The method of claim 21, wherein the oxygen disassociation product is selectively passed into the inner conduit of a first subset of the plurality of hollow fiber membranes, and the hydrogen disassociation product is selectively passed into the inner conduit of a second subset of the plurality of hollow fiber membranes.

24. The method of claim 23, wherein the oxygen and the hydrogen disassociation products exit the decomposition chamber solely by passing through the plurality of hollow fiber membranes.

25. The method of claim 21, further comprising focusing sunlight on a light absorbing target to generate the heat to disassociate water vapor.

26. The method of claim 25, wherein the light absorbing target comprises a light absorbing wall of the decomposition chamber.

27. The method of claim 25, wherein the decomposition chamber includes a wall substantially transparent to light, and the light absorbing target is positioned in the decomposition chamber.

28. The method of claim 25, the light absorbing target comprises a nozzle for a water inlet.

29. The method of claim 25, wherein the light absorbing target comprises at least a portion of a subset of the plurality of hollow fiber membranes.

30. The method of claim 25, wherein the light absorbing target comprises at least a portion of included packing material.

31. The method of claim 25, wherein the light absorbing target comprises a refractory material.

32. The method of claim 31, wherein the packing material includes at least one of ceramic foam, a ceramic grog, or ceramic fabric.

33. The method of claim 31, wherein the refractory material is sufficiently dark to absorb at least a portion of incident visible light.

34. The method of claim 21, wherein the sweep gas forms a difference in partial pressure for either the hydrogen or the oxygen disassociation products between the decomposition chamber and inner conduits for the plurality of hollow fiber membranes by removing the hydrogen or the oxygen disassociation products from the inner conduits.

35. The method of claim 21, wherein the sweep gas comprises at least one of nitrogen gas, argon gas, or water vapor.

36. The method of claim 21, wherein the plurality of hollow fiber membranes are formed by extrusion.

37. The method of claim 21, wherein the plurality of hollow fiber membranes comprise at least one of stabilized zirconia, $LaSrTiO_3$, perovskites, palladium, or palladium-based alloys.

38. The method of claim 21, wherein each of the plurality of hollow fiber membranes includes a curved portion such that each enters the decomposition through a same wall and exits the decomposition chamber through the same wall.

39. The method of claim 21, further comprises modifying residence times of gasses in the decomposition chamber using at least one of an inlet valve or an outlet valve.

* * * * *